(12) United States Patent
Lee et al.

(10) Patent No.: US 10,134,357 B2
(45) Date of Patent: Nov. 20, 2018

(54) SYSTEM AND METHOD FOR DEVICE PAIRING, AND MOBILE TERMINAL

(71) Applicant: LG ELECTRONICS INC., Seoul (KR)

(72) Inventors: Jihyun Lee, Seoul (KR); Jongmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

(21) Appl. No.: 15/100,907

(22) PCT Filed: Mar. 11, 2014

(86) PCT No.: PCT/KR2014/001992
§ 371 (c)(1),
(2) Date: Jun. 1, 2016

(87) PCT Pub. No.: WO2015/088105
PCT Pub. Date: Jun. 18, 2015

(65) Prior Publication Data
US 2016/0307539 A1    Oct. 20, 2016

(30) Foreign Application Priority Data

Dec. 12, 2013    (KR) .................... 10-2013-0154930

(51) Int. Cl.
*G09G 5/00*    (2006.01)
*G06F 3/00*    (2006.01)
(Continued)

(52) U.S. Cl.
CPC .......... *G09G 5/006* (2013.01); *G06F 3/1423* (2013.01); *G06F 11/3041* (2013.01);
(Continued)

(58) Field of Classification Search
CPC .............................. G09G 5/006; G06F 3/1423
(Continued)

(56) References Cited

U.S. PATENT DOCUMENTS 8,676,123 B1 *  3/2014  Hinkle ............ H04M 1/274508
                                                       455/41.2
8,953,565 B1 *  2/2015  Schlesener ......... H04L 12/6418
                                                        370/238
(Continued)

FOREIGN PATENT DOCUMENTS

| KR | 10-2010-0049623 A | 5/2010 |
| KR | 10-2012-0068646 A | 6/2012 |
| KR | 10-2012-0088962 A | 8/2012 |

*Primary Examiner* — Hai Tao Sun
(74) *Attorney, Agent, or Firm* — Birch, Stewart, Kolasch & Birch, LLP

(57) ABSTRACT

The present invention relates to a system and a method for device pairing which can pair a plurality of terminals using a brightness value change pattern. The system for device pairing according to an embodiment of the present invention comprises: an apparatus including a display; n terminals; and a server for connecting the apparatus including the display with the n terminals. The server assigns an ID to the apparatus including the display in accordance with an access request of the apparatus. The apparatus including the display calculates a brightness value change pattern corresponding to the ID, and outputs the pattern on the display. The n terminals can identify the ID after detecting the pattern outputted on the display using a proximity sensor and an illuminance sensor, transmit the ID to the server, and request an access.

7 Claims, 12 Drawing Sheets

(51) Int. Cl.
*G06F 3/14* (2006.01)
*G06F 11/30* (2006.01)
*G09G 5/04* (2006.01)
*G09G 5/10* (2006.01)

(52) U.S. Cl.
CPC ........... *G06F 11/3051* (2013.01); *G09G 5/04* (2013.01); *G09G 5/10* (2013.01); *G09G 2320/0606* (2013.01); *G09G 2320/0626* (2013.01); *G09G 2320/0666* (2013.01); *G09G 2354/00* (2013.01); *G09G 2370/022* (2013.01); *G09G 2370/042* (2013.01); *G09G 2370/06* (2013.01); *G09G 2370/10* (2013.01); *G09G 2370/16* (2013.01)

(58) Field of Classification Search
USPC ......................................................... 345/501
See application file for complete search history.

(56) References Cited

U.S. PATENT DOCUMENTS

| | | | |
|---|---|---|---|
| 2009/0034591 A1 | 2/2009 | Julian et al. | |
| 2009/0040542 A1* | 2/2009 | Furui | G06T 11/001 358/1.9 |
| 2010/0278345 A1* | 11/2010 | Alsina | H04L 63/0492 380/283 |
| 2011/0148754 A1* | 6/2011 | Inagaki | G01S 5/02 345/156 |
| 2012/0015605 A1 | 1/2012 | Sole | |
| 2012/0198098 A1 | 8/2012 | Kim et al. | |
| 2013/0111208 A1* | 5/2013 | Sabin | G06F 21/35 713/171 |
| 2013/0346182 A1* | 12/2013 | Cheng | G06Q 30/0242 705/14.41 |
| 2014/0232616 A1* | 8/2014 | Drake | H04B 5/02 345/1.2 |

* cited by examiner

| BINARY CODE | | BRIGHTNESS VALUE CHANGE PATTERN |
|---|---|---|
| | | STARTING VALUE 1 |
| FIRST | 0 | 0 |
| SECOND | 0 | 2 |
| THIRD | 0 | 1 |
| FOURTH | 0 | 0 |
| FIFTH | 1 | 1 |
| SIXTH | 0 | 0 |
| SEVENTH | 1 | 1 |
| EIGHTH | 0 | 0 |

SYSTEM AND METHOD FOR DEVICE PAIRING, AND MOBILE TERMINAL

CROSS REFERENCE TO RELATED APPLICATIONS

This application is the National Phase of PCT International Application No. PCT/KR2014/001992, filed on Mar. 11, 2014, which claims priority under 35 U.S.C. 119(a) to Patent Application No. 10-2013-0154930, filed in Republic of Korea on Dec. 12, 2013, all of which are hereby expressly incorporated by reference into the present application.

TECHNICAL FIELD

The present invention relates to a device pairing system and a device pairing method, and more particularly, to a device pairing system capable of pairing a plurality of terminals with each other, and a device paring method.

BACKGROUND ART

The conventional pairing technique requires bump of time and space, a specific sensor (a color sensor, nfc), etc., and executes one-to-one (1:1) connection. Further, in order to read an RGB color pattern on a screen, an additional color sensor is required, or an ID should be set in advance.

DISCLOSURE OF THE INVENTION

Therefore, an object of the present invention is to provide a device pairing system capable of pairing a plurality of terminals with each other based on a brightness value change pattern, and a device pairing method.

To achieve these and other advantages and in accordance with the purpose of the present invention, as embodied and broadly described herein, there is provided a device pairing system, including: a device having a display; n terminals; and a server configured to connect the device having a display with the n terminals, wherein the server provides an ID to the device having a display according to an access request from the device, wherein the device having a display calculates a brightness value change pattern corresponding to the ID, and outputs the pattern to the display, and wherein each of the n terminals detects the pattern output to the display using a proximity sensor and a light sensor, then recognizes the ID, transmits the ID to the server, and requests for access.

In an embodiment, the device having a display may convert the ID into a binary code, and then may calculate the brightness value change pattern in an HSL color space according to a preset regulation.

In an embodiment, if at least one of the n terminals moves in a proximity state to the display by a preset degree, the device having a display may output the brightness value change pattern on a region of the display corresponding to a position where the at least one terminal has moved.

In an embodiment, if at least one of the n terminals approaches the display by a preset degree, the device having a display may output the brightness value change pattern on a region of the display corresponding to a position where the at least one terminal has approached.

To achieve these and other advantages and in accordance with the purpose of the present invention, as embodied and broadly described herein, there is also provided a device pairing method, including: (a) requesting to a server for access, by a device having a display; (b) assigning an ID to the device according to the access request, and transmitting the ID to the device by the server; (c) calculating a brightness value change pattern corresponding to the received ID, and outputting the pattern to the display by the device; (d) detecting the pattern output to the display using a proximity sensor and a light sensor, then recognizing the ID, and transmitting the recognized ID to the server to request for access by each of the n terminals; and (e) connecting the device having a display to the n terminals by the server.

In an embodiment, the step of (c) may include converting the ID into a binary code, and then calculating the brightness value change pattern in an HSL color space according to a preset regulation, by the device having a display.

In an embodiment, the step of (c) may include outputting the brightness value change pattern on a region of the display corresponding to a position where at least one of the n terminals has moved, by the device having a display, if the at least one terminal moves in a proximity state to the display by a preset degree.

In an embodiment, the step of (c) may include outputting the brightness value change pattern on a region of the display corresponding to a position where at least one of the n terminals has approached, if the at least one terminal has approached the display by a preset degree.

To achieve these and other advantages and in accordance with the purpose of the present invention, as embodied and broadly described herein, there is also provided a mobile terminal, including: a proximity sensor configured to sense a proximity degree with a device having a display; a light sensor configured to sense a brightness value change pattern output to the display; and a controller configured to recognize an ID corresponding to the sensed brightness value change pattern, to transmit the recognized ID to a server, and to request for access, wherein the device having a display requests to the server for access to thus be provided with the ID, calculates a brightness value change pattern corresponding to the ID, and outputs the pattern to the display, and wherein the server connects the device having a display with the mobile terminal according to the access request from the controller.

Advantages

Firstly, since a brightness value change pattern to which a different color change pattern has been added is output, the present invention may be implemented in various manners. Further, a plurality of terminals may be paired with each other without a user's additional input. Besides, unlike in the conventional art, a user needs not know a unique identifier in advance.

MODES FOR CARRYING OUT THE PREFERRED EMBODIMENTS

Description will now be given in detail according to the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

The conventional pairing technique requires bump of time and space, a specific sensor (a color sensor, nfc), etc., and executes one-to-one (1:1) connection. Further, in order to read an RGB color pattern on a screen, an additional color sensor is required, or an ID should be set in advance.

A device pairing system 100 capable of enhancing user's convenience in connecting a plurality of terminals to each other, and a device pairing method will be explained in more detail with reference to the attached drawings.

Figure 1:
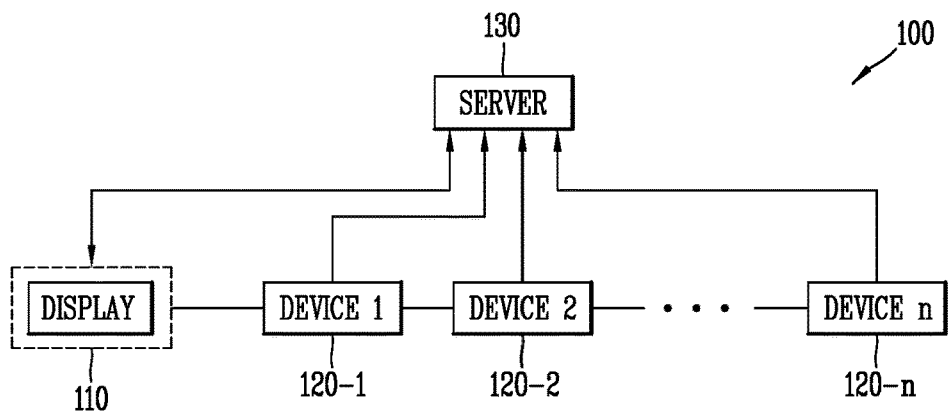
FIG. 1 is a block diagram illustrating a device pairing system according to an embodiment of the present invention.

FIG. 1 is a block diagram illustrating the device pairing system 100 according to an embodiment of the present invention.

Referring to FIG. 1, the device pairing system 100 according to the present invention includes a device 110 having a display, n terminals 120-1, 120-2, . . . 120-*n*, and a server 130.

More specifically, the device 110 having a display may request to the server 130 for connection, and may calculate a brightness value change pattern corresponding to an ID received from the server 130 according to the request.

Then, the device 110 may output the calculated brightness value change pattern on the display. In an embodiment, the calculated brightness value change pattern may be output together with any color value change pattern.

The device 110 having a display may be implemented as any device including a display for outputting a calculated brightness value change pattern.

In an embodiment, the device may be implemented as a mobile terminal such as a portable phone, a smart phone, a laptop computer, a digital broadcasting terminal, a personal digital assistant (PDA), a portable multimedia player (PMP), a navigation, a slate PC, a tablet PC, an ultrabook, a digital TV, a desktop computer, a smart watch, and a remote controller for a smart TV, and a fixed terminal.

In another embodiment, the device may be implemented as a refrigerator, a washing machine, a cleaner, a microwave oven, an oven, a gas range, a cooling/heating device, etc. each having a display.

In another embodiment, the device may be implemented as an additional monitor, a lighting device, a lamp, etc. each having a function to output a brightness value change pattern as a major function.

In another embodiment, a brightness value change pattern may be output to a region of an image projected from a projector, not a display.

Each of n terminals 120-1, 120-2, . . . 120-*n* may detect a brightness value change pattern output to the display of the device 110, using a proximity sensor and a light sensor.

With such a configuration, each of the terminals may recognize an ID provided to the device 110 having a display from the server 130, may transmit the ID to the server 130, and may request connection with the device 110 having a display.

Each of the n terminals 120-1, 120-2, . . . 120-*n* may be implemented as any device including a proximity sensor and a light sensor for sensing a brightness value change pattern output to the display of the device 110.

In an embodiment, each of the terminals may be implemented as a mobile terminal such as a portable phone, a smart phone, a laptop computer, a digital broadcasting terminal, a personal digital assistant (PDA), a portable multimedia player (PMP), a navigation, a slate PC, a tablet PC, an ultrabook, a digital TV, a desktop computer, a smart watch, and a remote controller for a smart TV, and a fixed terminal.

As aforementioned, the server 130 may assign an ID to the device 110 having a display, according to an access request from the device 110.

In an embodiment, the server 130 may be positioned in the device 110 having a display, or may be separately disposed.

The server 130 may pair the device 110 having a display, with the n terminals 120-1, 120-2, . . . 120-*n* which have requested for access.

Figure 2:
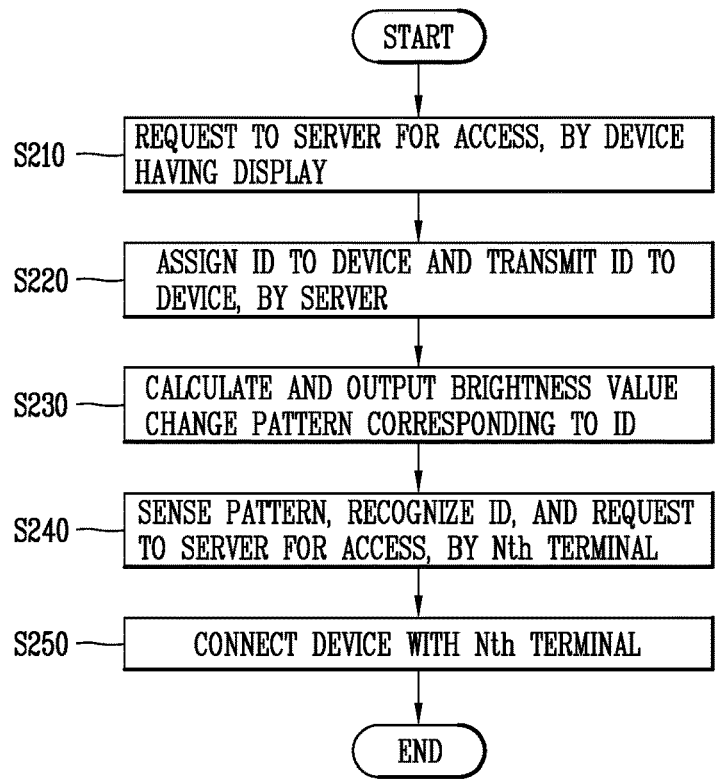
FIG. 2 is a flowchart illustrating a device pairing system according to an embodiment of the present invention.

FIG. 2 is a flowchart illustrating the device pairing system 100 according to an embodiment of the present invention.

Referring to FIG. 2, the device 110 having a display requests to the server 130 for access (S210).

Then, the server 130 assigns an ID to the device 110 according to the access request from the device 110 having a display, and transmits the ID to the device 110 (S220).

More specifically, the server 130 may provide an ID indicating a number, an operation command, etc., to the device 110 having a display.

Then, the device 110 having a display calculates a brightness value change pattern corresponding to the received ID, and outputs the calculated brightness value change pattern on the display (S230).

In an embodiment, the device 110 having a display may convert the ID into a binary code, and then may calculate and output a brightness value change pattern in an HSL color space, according to a preset regulation.

As aforementioned, the device 110 may output a brightness value change pattern together with any color value change pattern.

Then, the $n^{th}$ terminal 120-*n* detects the pattern output to the display using a proximity sensor and a light sensor, and then recognizes the ID. Then, the $n^{th}$ terminal 120-*n* transmits the recognized ID to the server 130 to request for access (S240).

Generally, when a proximity sensor value of a terminal is determined as near, a light sensor value of the terminal becomes small (dark), because the terminal is in a proximity state.

Based on such a principle, if a light sensor value of the $n^{th}$ terminal 120-$n$ is continuously changed when a proximity sensor value of the $n^{th}$ terminal 120-$n$ is in a near state, the $n^{th}$ terminal 120-$n$ reads the light sensor value by determining that a user has moved the $n^{th}$ terminal 120-$n$ near the display for pairing.

More specifically, the $n^{th}$ terminal 120-$n$ may divide a section based on the light sensor value, generate a pattern, and then convert the generated pattern into an ID.

In an embodiment, a k-means clustering method using the following formula 1 may be used.

$$\underset{s}{\operatorname{argmin}} \sum_{i=1}^{k} \sum_{x_j \in S_i} \|x_j - \mu_i\|^2 \quad \text{[Formula 1]}$$

Here, 'k' means the number of clusters to be divided from each other, 'Si' means a set of points which belong to the inside of each cluster, and 'pi' means the center of an $i^{th}$ cluster.

That is, a section is divided to have a minimum value, a maximum value and a middle value, and a plurality of values are clustered based on the values. Then, an average of each section is calculated for re-clustering, such that each section has a minimized variation.

Then, the server 130 connects the device 110 having a display with the $n^{th}$ terminal 120-$n$ which has requested for access (S250).

That is, in the conventional art, pairing between devices is executed as a preset ID of a terminal is transmitted to another terminal or a server.

On the contrary, in the device pairing system 100, pairing may be executed as the server 130 provides an ID including a number, an operation command, etc. to the device 110 having a display, and as the n terminals 120-1, 120-2, . . . 120-$n$ follow a server direction of the device 110 having a display.

As aforementioned, the device 110 having a display may request to the server 130 for access, and may calculate a brightness value change pattern corresponding to an ID received from the server 130 according to the request.

For calculation of such a brightness value change pattern, if an H value (color value) is changed in a fixed state of an S value (a chroma value) and an L value (brightness value) in a color space, a light sensor recognizes a value with maintaining a constant ratio, even if a brightness value of the display or a type of the device having a display is changed.

Figures 3, 4:
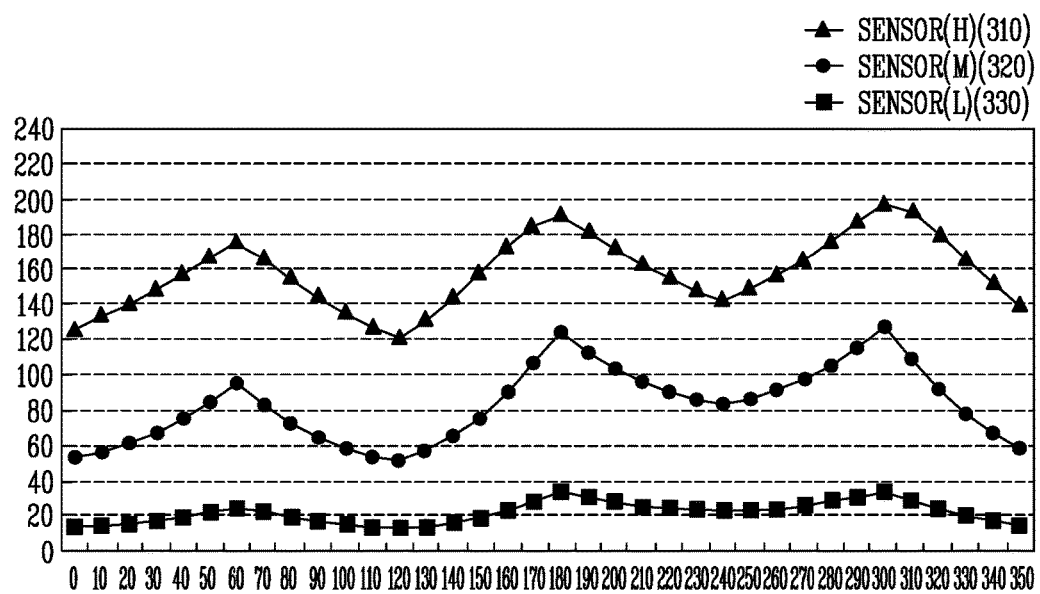
FIG. 3 is a conceptual view illustrating a principle to calculate a brightness value change pattern.
FIG. 4 is a conceptual view illustrating an embodiment to calculate a brightness value change pattern.
Figure 5:
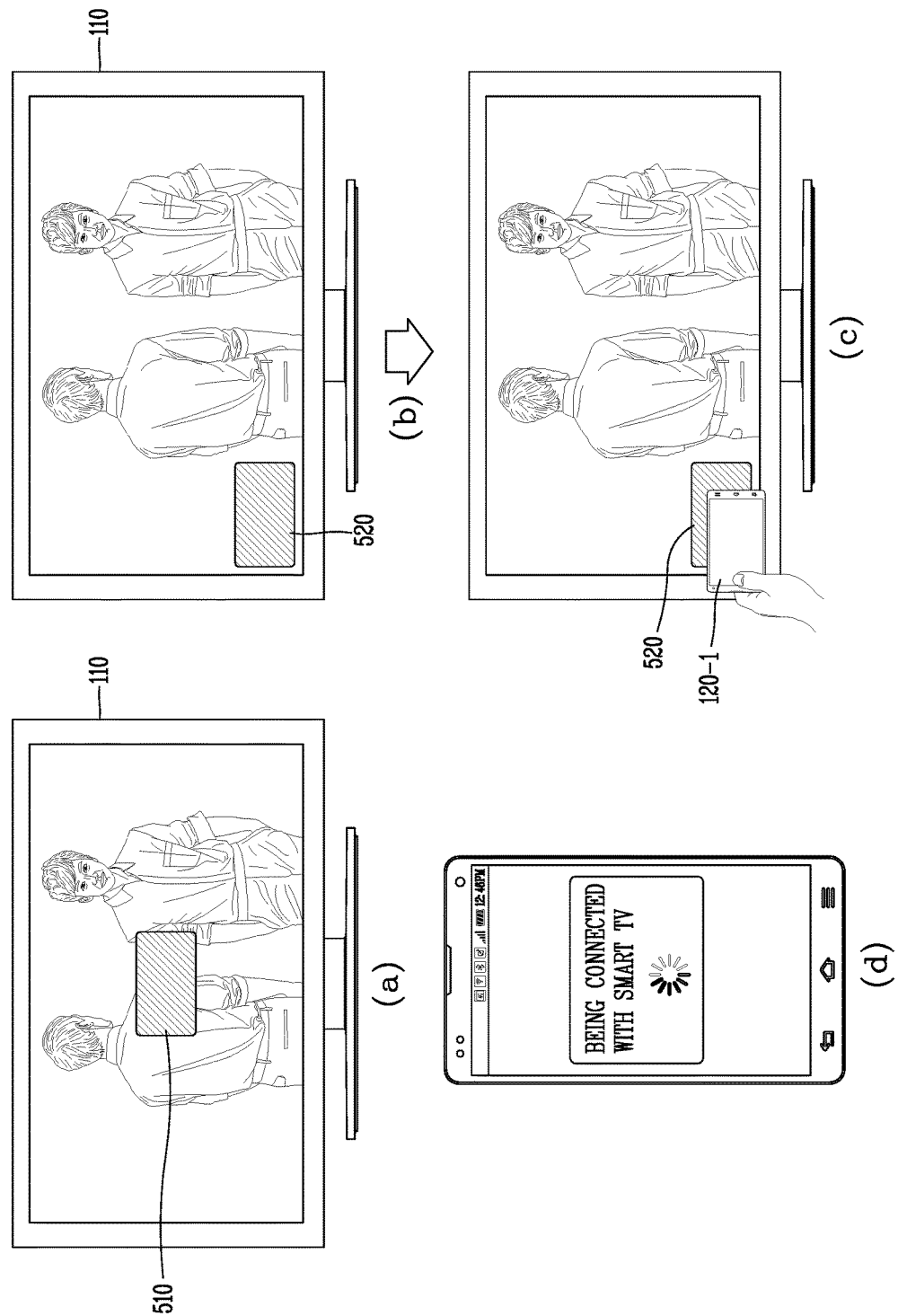
FIGS. 5 to 8 are conceptual views illustrating examples of a brightness value change patterns output to a device having a display.

FIG. 3 is a conceptual view illustrating a principle to calculate a brightness value change pattern.

Referring to FIG. 3, a vertical axis means a value read by a light sensor, and a horizontal axis means an H value. Graphs 310, 320, 330 indicate values read by the light sensor when an H value (color value) is changed after an S value (a chroma value) and an L value (a brightness value) are fixed, in a state where a display is set to have a maximum brightness, a middle brightness and a minimum brightness.

Referring to the respective graphs 310, 320, 330, it may be observed that values of the light sensor have a constant pattern according to the H value and the L value, even if a brightness value of a monitor is different.

Based on such a principle, the device 110 having a display may convert an ID received from the server 130 into a binary code, and then may calculate a brightness value change pattern in an HSL color space, according to a preset regulation.

In an embodiment, a brightness value change pattern may be calculated with a principle to divide an L value which influences on the light sensor the most, into 3 sections, and to change an H value.

FIG. 4 is a conceptual view illustrating an embodiment to calculate a brightness value change pattern.

Referring to FIG. 4, when an ID is 10, a binary code may be converted into 00001010. In this case, it may be set that a bit value '0' indicates a section drop and a bit value '1' indicates a section rise in a binary pattern. Further, an L value may be divided into 3 sections of '2, 1, 0', and a starting value may be set as '1'.

First of all, since a first bit value '0' indicates a section drop, a brightness value is set as '0' obtained by decreasing from the starting value '1'. Since a second bit value '0' indicates a section drop, a brightness value should be decreased to '−1'. However, the brightness value is set as '2' since '−1' does not exist.

Since a third bit value '0' indicates a section drop, a brightness value is set as '1' obtained by decreasing from '2'. Since a fourth bit value '0' indicates a section drop, a brightness value is set as '0' obtained by decreasing from '1'.

Since a fifth bit value '1' indicates a section rise, a brightness value is set as '1' obtained by increasing from '0'. Since a sixth bit value '0' indicates a section drop, a brightness value is set as '0' obtained by decreasing from '1'.

Since a seventh bit value '1' indicates a section rise, a brightness value is set as '1' obtained by increasing from '0'. Since an eighth bit value '0' indicates a section drop, a brightness value is set as '0' obtained by decreasing from '1'.

With such processes, a brightness value change pattern corresponding to the ID '10' (binary code '00001010') may be set as '02101010'. That is, as the brightness values are categorized into three levels (high/middle/low), the '02101010' indicates a pattern of brightness values of a display which represent low, high, middle, low, middle, low, middle and low.

Any color value change pattern may be added to such an output brightness value change pattern. For instance, any color such as dark red, dark blue, yellow and bright orange may be output together with a brightness value change pattern. That is, in the present invention, since an ID is represented through a mere change of a brightness value, any color may be output together with the brightness value.

In another embodiment, a color may be added to a brightness value to be output, for representation of a shape or a text not a single color. With such a configuration, advertisements for products or services may be output.

More specifically, once a user moves a mobile terminal near a brightness value change pattern indicating an advertisement for a product or a service, the mobile terminal may read the brightness value change pattern, and may output an advertising website for the corresponding product or service.

FIGS. 5 to 8 are conceptual views illustrating examples of a brightness value change pattern output to a device having a display.

Referring to FIG. 5(a), a brightness value change pattern 510 may be output to a display of a smart TV 110 in the form of a pop-up window.

Referring to FIG. 5(b), a brightness value change pattern 520 may be output to a corner of the display of the smart TV 110.

That is, the brightness value change pattern 520 may be output to a region which does not cover content being output to the smart TV 110.

Referring to FIG. 5(c), as a user moves a first mobile terminal 120-1 near the brightness value change pattern 520 output to the display, the first mobile terminal 120-1 may read the brightness value change pattern 520.

Then, the first mobile terminal 120-1 may recognize an ID from the brightness value change pattern 520, transmit the recognized ID to the server 130, and request for access. Accordingly, the server 130 pairs the first mobile terminal 120-1 with the smart TV 110.

Referring to FIG. 5(d), a message window 530, indicating that the first mobile terminal 120-1 is being connected to the smart TV 110, may be output to the first mobile terminal 120-1 which has requested to the server 130 for access.

Likewise, once a user moves a second mobile terminal 120-2 near the brightness value change pattern output to the display, the second mobile terminal 120-2 may read the brightness value change pattern 520.

Then, the second mobile terminal 120-2 may recognize an ID from the brightness value change pattern 520, transmit the recognized ID to the server 130, and request for access. Accordingly, the server 130 pairs the second mobile terminal 120-2 with the smart TV 110 and the first mobile terminal 120-1.

Likewise, once a user moves an $n^{th}$ mobile terminal 120-n near the brightness value change pattern 520 output to the display, the server 130 is pairs the $n^{th}$ mobile terminal 120-n with the smart TV 110, the first mobile terminal 120-1, the second mobile terminal 120-2, etc. That is, pairing may be sequentially executed in order of the mobile terminal which approaches the display.

Figure 6:
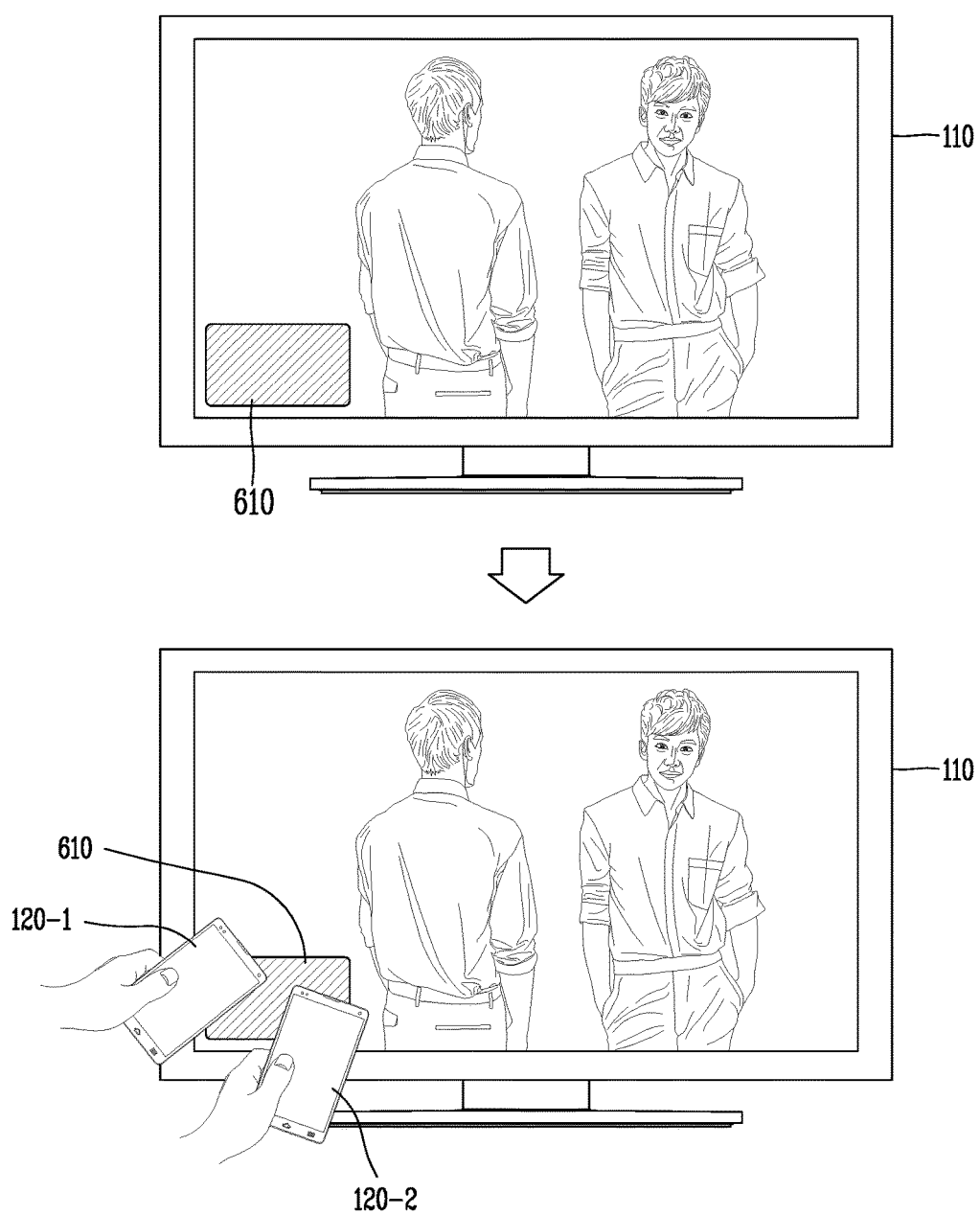

Referring to FIG. 6, a brightness value change pattern 610 may be output to a corner of the display of the smart TV 110. Then, a first user and a second user may simultaneously move a first mobile terminal 120-1 and a second mobile terminal 120-2, near the brightness value change pattern 610 output to the display.

Then, each of the first and second mobile terminals 120-1, 120-2 may recognize an ID by reading the brightness value change pattern 610, transmit the recognized ID to the server 130, and request for access. Accordingly, the server 130 simultaneously pairs the smart TV 110, the first mobile terminal 120-1 and the second mobile terminal 120-2 with one another.

If at least one of n terminals 120-1, 120-2, . . . 120-n moves in a proximity state to the display by a preset degree, the device 110 having a display may output a brightness value change pattern on a region of the display corresponding to a position where the at least one terminal has moved.

Figure 7:
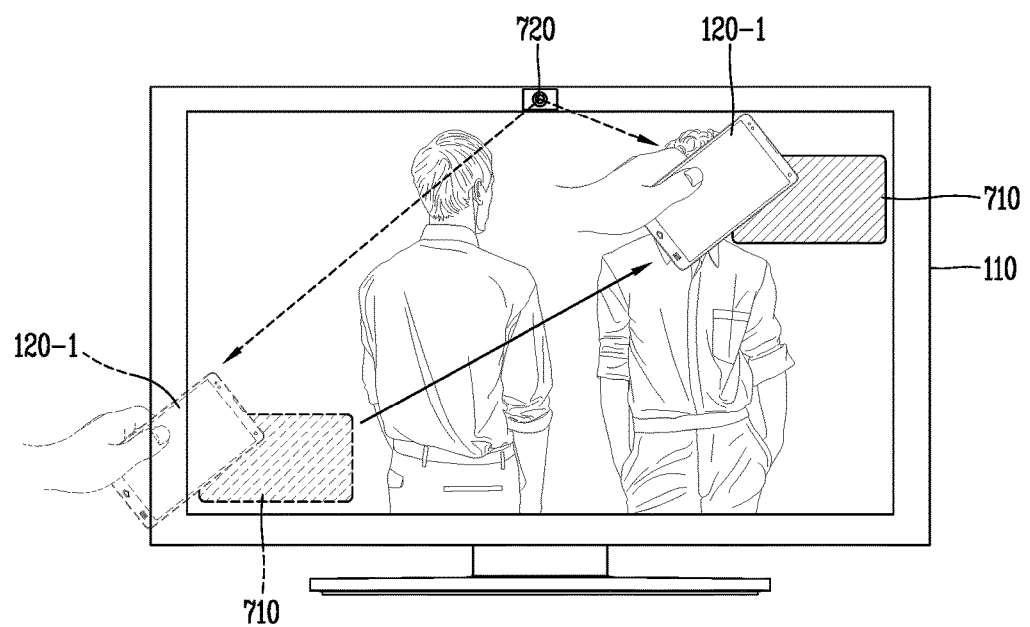

Referring to FIG. 7, a brightness value change pattern 710 may be output to a corner of the display of the smart TV 110.

Then, a user may move a first mobile terminal 120-1 near the corner of the display to which the brightness value change pattern 710 has been output, and then may move the first mobile terminal 120-1 to another region of the display.

In this case, the smart TV 110 may turn on a camera 720 to detect a movement of the first mobile terminal 120-1 and a position change of the first mobile terminal 120-1.

In another embodiment, a movement of the first mobile terminal 120-1 and a position change of the first mobile terminal 120-1 may be sensed by a proximity touch sensor mounted in the smart TV 110.

The brightness value change pattern 710 may be moved to correspond to a position where the first mobile terminal 120-1 has moved, and may be output to a region on the display.

If at least one of the n terminals 120-1, 120-2, . . . 120-n approaches the display by a preset degree, the device 110 having a display may output a brightness value change pattern on a region of the display corresponding to a position where the at least one terminal has approached.

Figure 8:
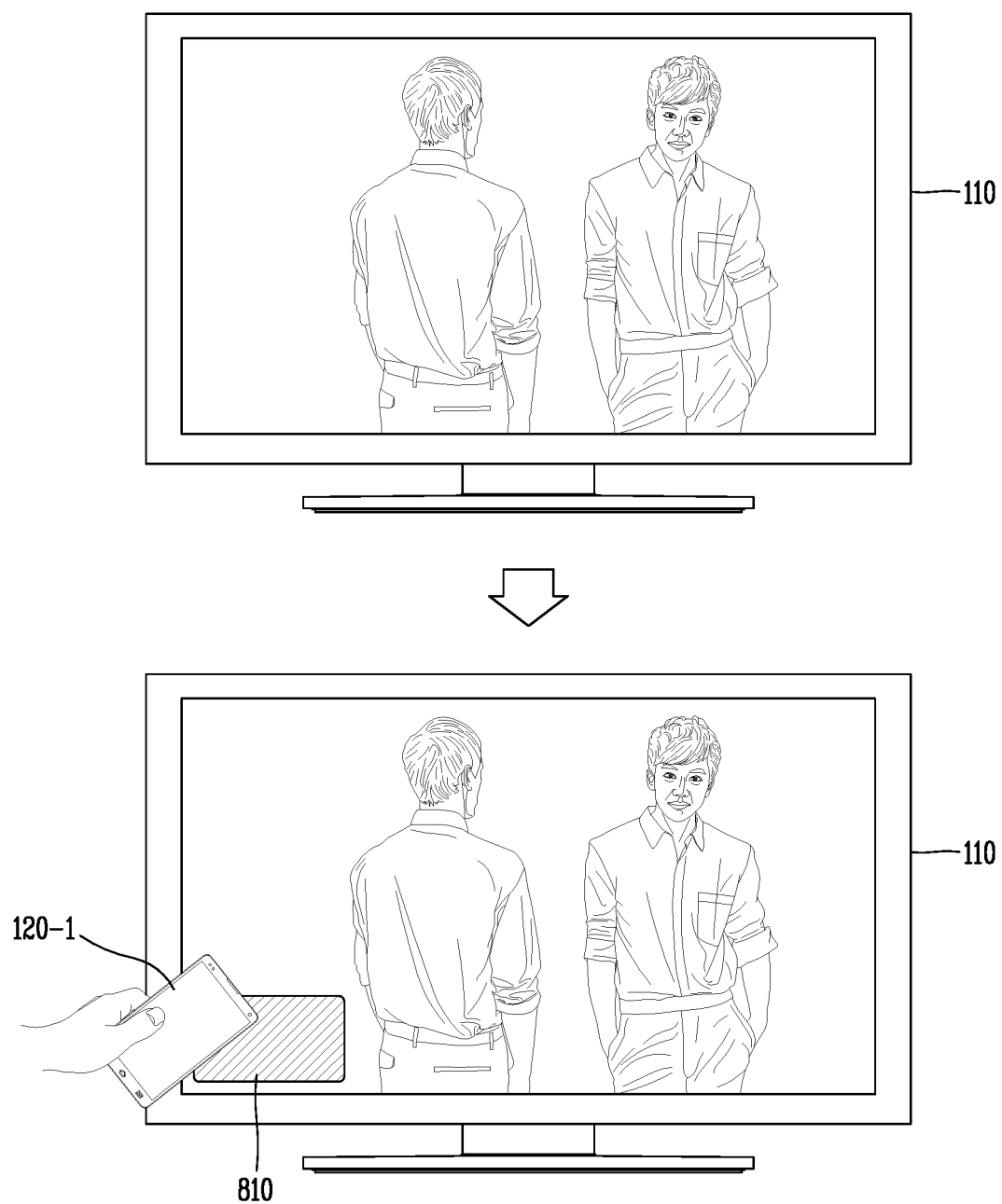

Referring to FIG. 8, once a user moves the first mobile terminal 120-1 near the display of the smart TV 110, a brightness value change pattern 810 may be output to a region of the display corresponding to a position of the first mobile terminal 120-1.

That is, since the brightness value change pattern 810 is not output until the user moves the first mobile terminal 120-1 near the display of the smart TV 110, a time duration for which the user feels disturbed due to output of the brightness value change pattern 810 may be reduced.

As aforementioned, the device 110 having a display may be implemented as not only mobile and stationary terminals, but also home appliances such as a refrigerator, a washing machine, a cleaner, a microwave oven, an oven, a gas range and a cooling/heating device.

FIGS. 9A to 9D are conceptual views illustrating examples of the device 110 having a display.

Figure 9A:
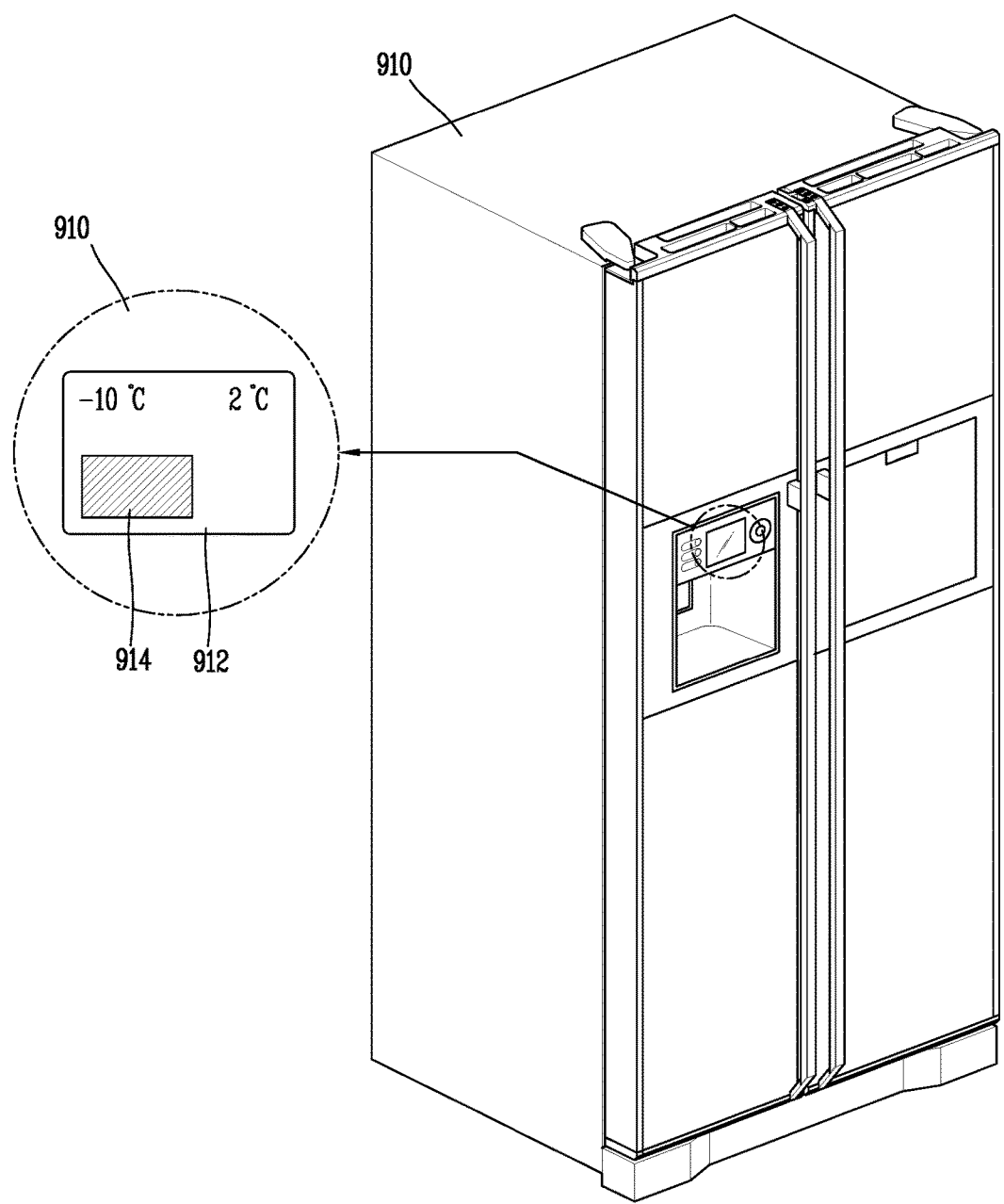
FIGS. 9A to 9D are conceptual views illustrating examples of a device having a display.

Referring to FIG. 9A, the device 110 having a display may be implemented as a refrigerator 910 having a display 912. A brightness value change pattern 914 may be output to the display 912 of the refrigerator 910, together with a current refrigeration temperature and a current freezing temperature or a current state.

A user may move an $n^{th}$ mobile terminal 120-n near the brightness value change pattern 914, thereby recognizing an ID and executing pairing. Once the pairing is executed, the $n^{th}$ mobile terminal 120-n may receive the current refrigeration temperature and the current freezing temperature or the current state, from the refrigerator 910. Accordingly, the user may control the refrigerator 910 by using the $n^{th}$ mobile terminal 120-n.

Figure 9B:
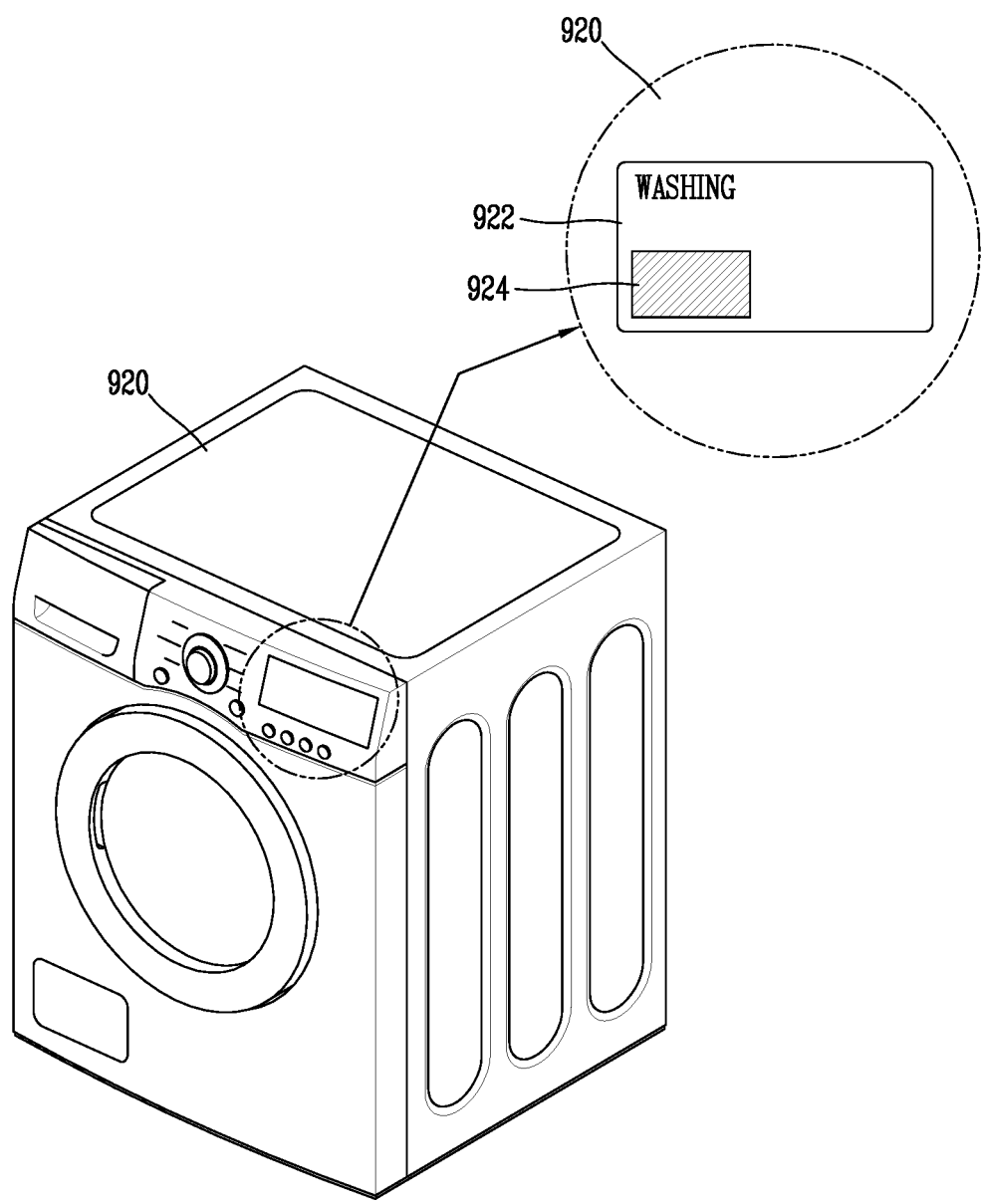

Referring to FIG. 9B, the device 110 having a display may be implemented as a washing machine 920 having a display 922. Since the display 922 of the washing machine 920 is implemented as a color or black-and-white display panel, brightness values may be categorized into three levels (high/middle/low), and may be displayed to have a pattern.

A brightness value change pattern 924 may be output to the display 922 of the washing machine 920, together with a washing mode, a washing completion time, a washing progress state, etc. Accordingly, a user may moves the $n^{th}$ mobile terminal 120-n near the brightness value change pattern 924, thereby recognizing an ID and executing pairing.

Once the pairing is executed, the $n^{th}$ mobile terminal 120-n may receive the washing mode, the washing completion time, the washing progress state, etc., from the washing machine 920. Accordingly, the user may control the washing machine 920 by using the $n^{th}$ mobile terminal 120-n.

Figure 9C:
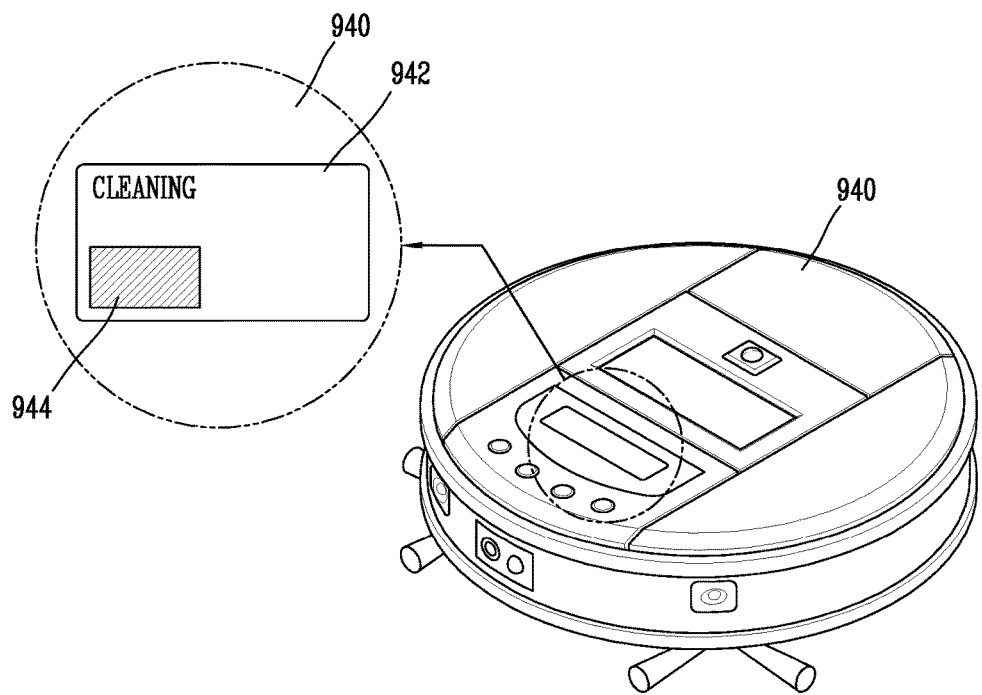

Referring to FIG. 9C, the device 110 having a display may be implemented as a robot cleaner 940 having a display 942. Since the display 942 of the robot cleaner 940 is implemented as a color or black-and-white display panel, brightness values may be categorized into three levels (high/middle/low), and may be displayed to have a pattern.

A brightness value change pattern 944 may be output to the display 942 of the robot cleaner 940, together with information about whether an obstacle has been detected or not, a cleaning progress state, etc. Accordingly, a user may moves the $n^{th}$ mobile terminal 120-$n$ near the brightness value change pattern 944, thereby recognizing an ID and executing pairing.

Once the pairing is executed, the $n^{th}$ mobile terminal 120-$n$ may receive the information about whether an obstacle has been detected or not, the cleaning progress state, etc., from the robot cleaner 940. Accordingly, the user may control the robot cleaner 940 by using the $n^{th}$ mobile terminal 120-$n$.

Figure 9D:
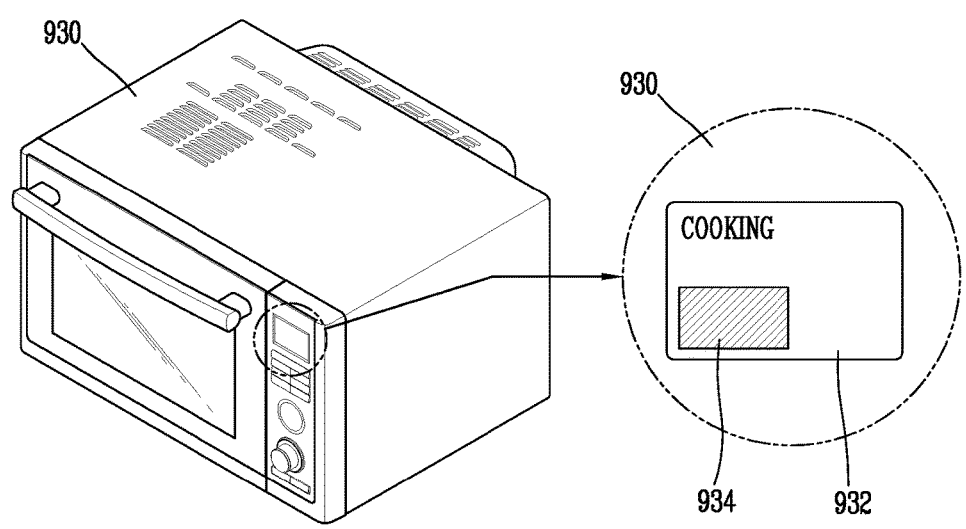

Referring to FIG. 9D, the device 110 having a display may be implemented as a microwave oven 930 having a display 932. Since the display 932 of the microwave oven 930 is implemented as a color or black-and-white display panel, brightness values may be categorized into three levels (high/middle/low), and may be displayed to have a pattern.

A brightness value change pattern 934 may be output to the display 932 of the microwave oven 930, together with a dish type, a dish completion time, a dish progress state, etc. Accordingly, a user may move the $n^{th}$ mobile terminal 120-$n$ near the brightness value change pattern 934, thereby recognizing an ID and executing pairing.

Once the pairing is executed, the $n^{th}$ mobile terminal 120-$n$ may receive the dish type, the dish completion time, the dish progress state, etc., from the microwave oven 930. Accordingly, the user may control the microwave oven 930 by using the $n^{th}$ mobile terminal 120-$n$.

As aforementioned, any color value change pattern may be output together with a brightness value change pattern. For instance, any color such as dark red, dark blue, yellow and bright orange may be output together with a brightness value change pattern.

Figure 10:
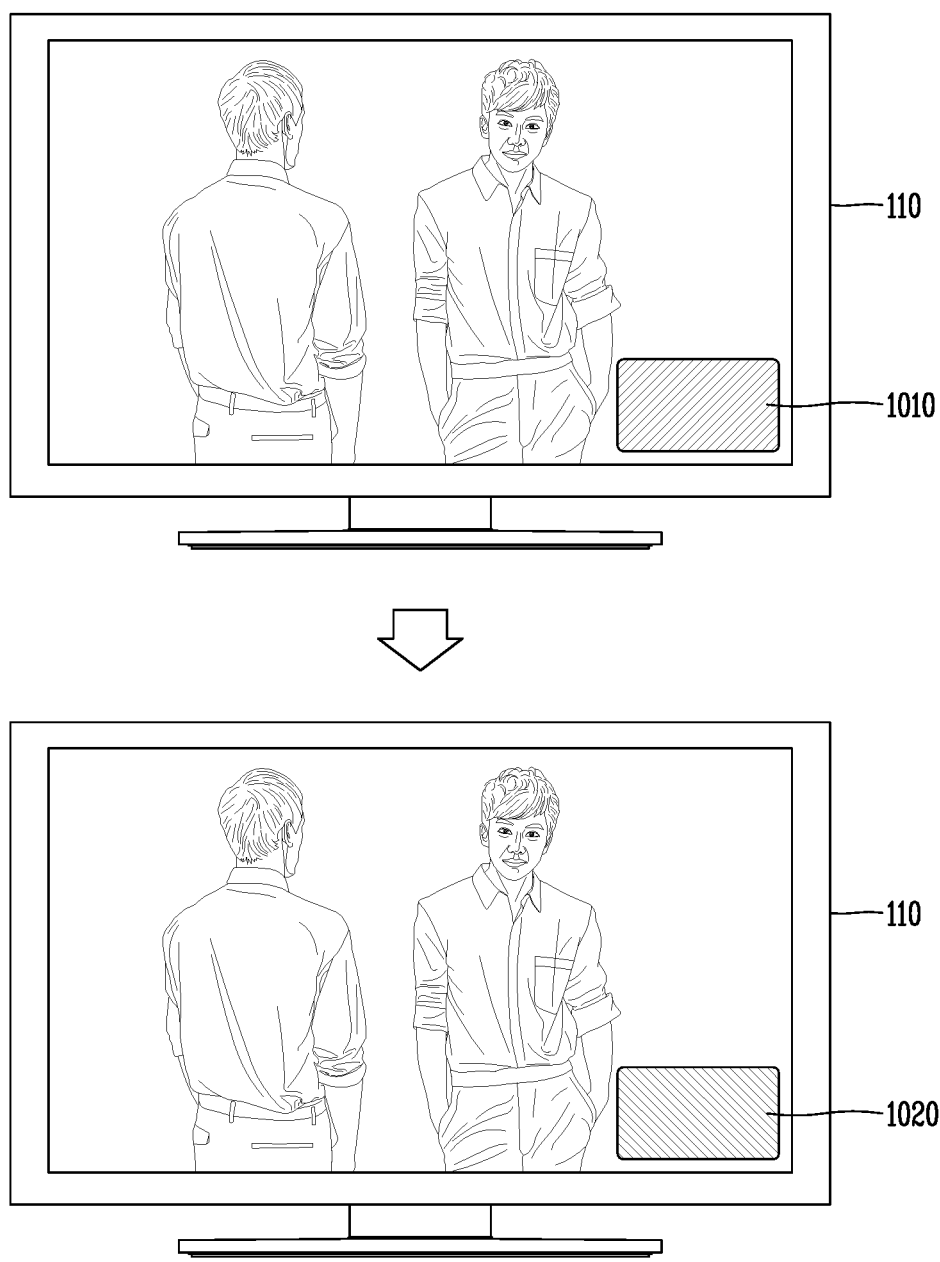
FIGS. 10 and 11 are conceptual views illustrating still other examples of a brightness value change pattern output to a device having a display.
Figure 11:
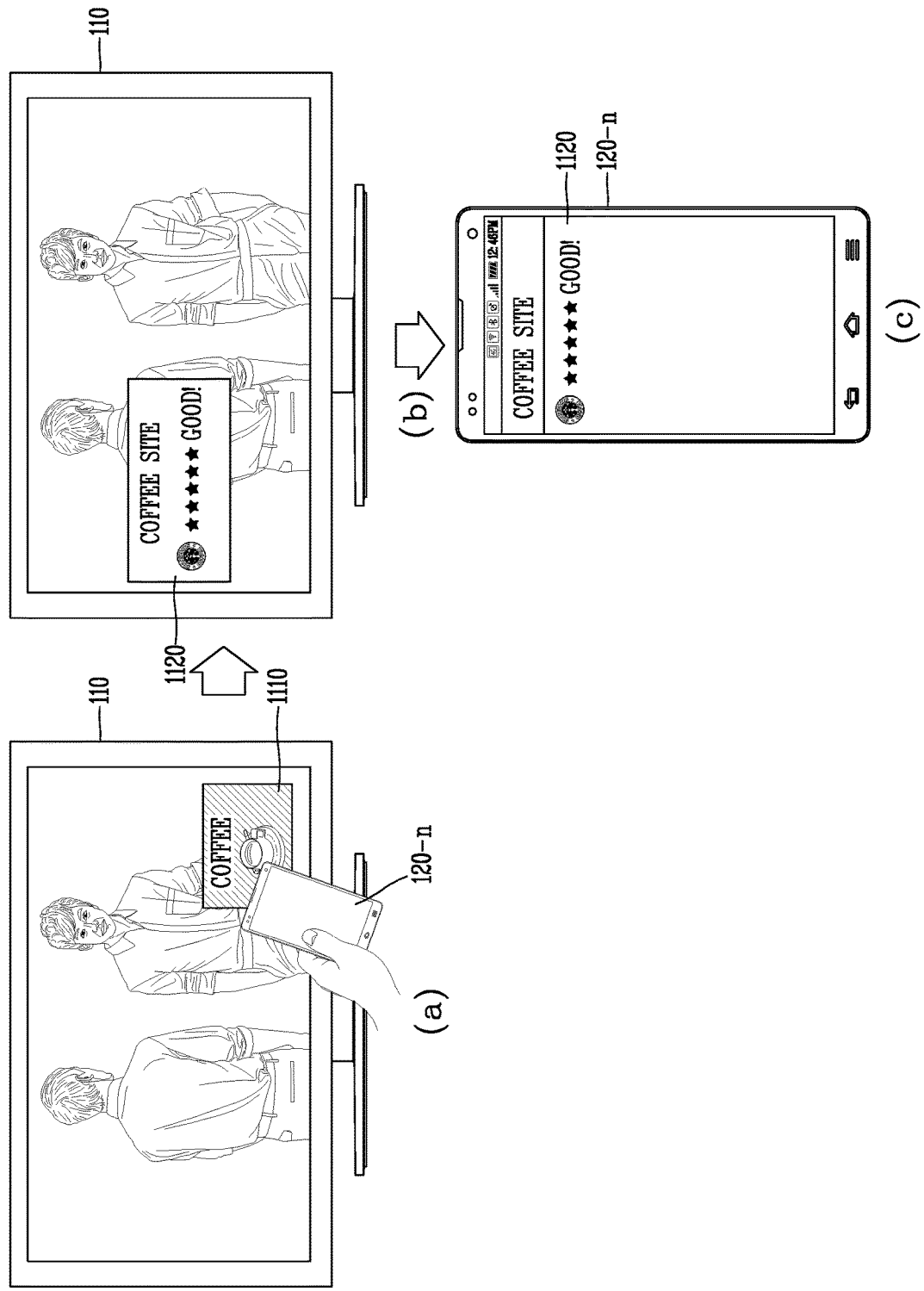

FIGS. 10 and 11 are conceptual views illustrating still other examples of a brightness value change pattern output to the device having a display.

Referring to FIG. 10, if a brightness value is changed from a highest level to a lowest level, a color value change pattern may be added to the brightness value to thus be output, such that a bright blue color 1010 may be changed into a dark red color 1020.

That is, in the present invention, since an ID is represented through a mere change of a brightness value, any color may be output together with the brightness value.

In another embodiment, a color may be added to a brightness value change pattern to thus be output, for representation of a shape or a text not a single color. With such a configuration, advertisements for products or services may be output.

Referring to FIG. 11(a), a brightness value change pattern 1110, indicating an advertisement image by adding a color in order to represent a shape or a text, may be output. Accordingly, a user may read the brightness value change pattern 1110 by moving the $n^{th}$ mobile terminal 120-$n$ near the brightness value change pattern 1110 indicating a service advertisement.

In another embodiment, a brightness value change pattern, indicating images which change (e.g., videos) at a time period equal to or similar to a change period of a brightness value, may be output.

For instance, in a case where a brightness value is changed from a highest level to a lowest level, a brightest image indicating a product rating may be output, and then a darkest image about a product rating may be output.

Referring to FIG. 11(b), once the smart TV 110 and the $n^{th}$ mobile terminal 120-$n$ are paired with each other, a detailed content 1120 related to a product advertisement output as the brightness value change pattern 1110, may be output to the smart TV 110.

For instance, an advertisement site of a product output as the brightness value change pattern 1110, a home page of the product, detailed information on the product, etc. may be output as the content 1120.

Referring to FIG. 11(c), once the smart TV 110 and the $n^{th}$ mobile terminal 120-$n$ are paired with each other, the detailed content 1120 related to a product advertisement output as the brightness value change pattern 1110, may be also output to the $n^{th}$ mobile terminal 120-$n$.

Accordingly, a user may check the advertisement site of a product, the home page of the product, detailed information on the product, etc., on the $n^{th}$ mobile terminal 120-$n$.

Figure 12:
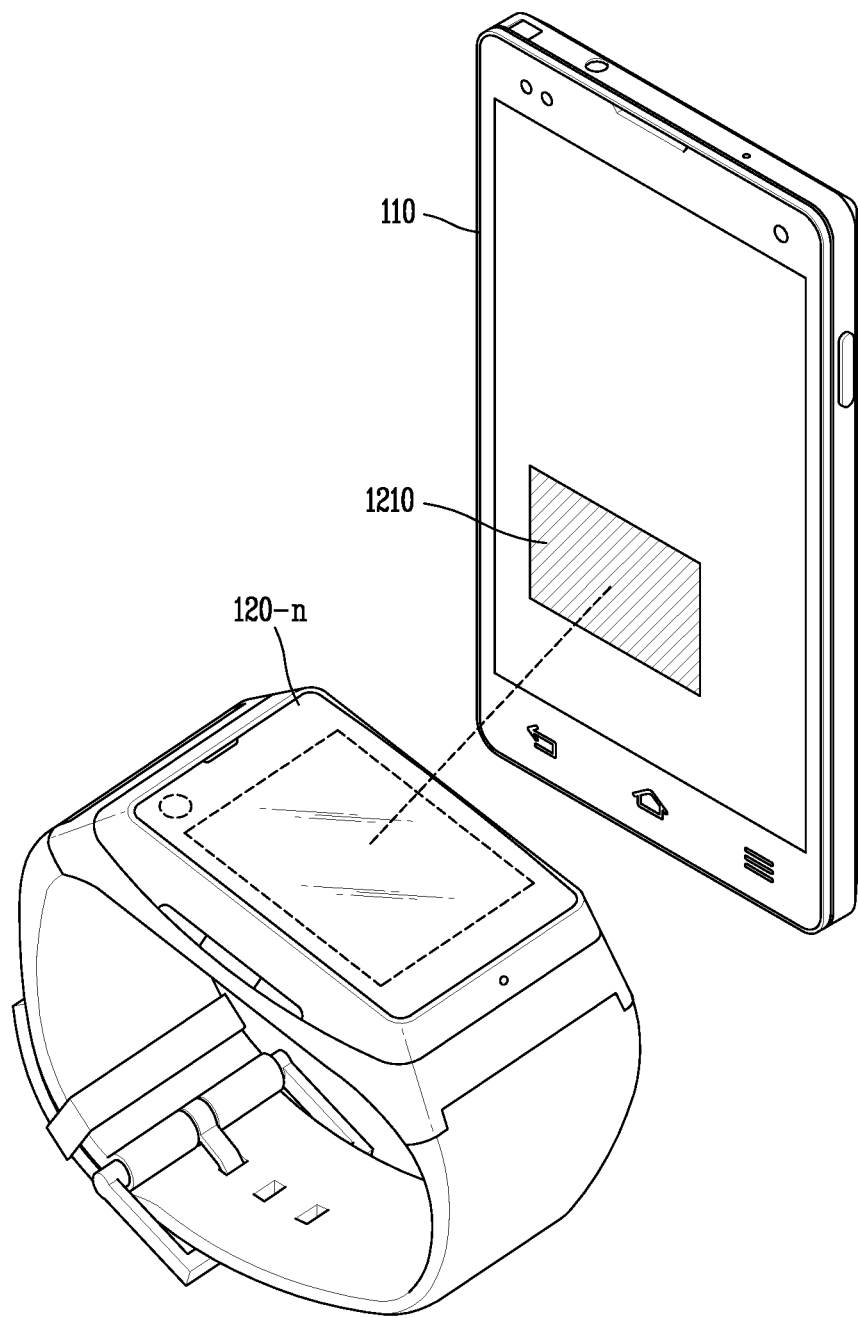
FIG. 12 is a conceptual view illustrating pairing between mobile terminals according to an embodiment of the present invention.

FIG. 12 is a conceptual view illustrating pairing between mobile terminals according to an embodiment of the present invention.

Referring to FIG. 12, as a smart watch 120-$n$ reads a brightness value change pattern 1210 output to a smart phone 110, pairing between the smart phone 110 and the smart watch 120-$n$ is executed.

Accordingly, the smart watch 120-$n$ may exchange data with the smart phone 110 which has read the output brightness value change pattern 1210, as well as a smart phone preset to control the smart watch 120-$n$, or may control the smart phone 110.

Likewise, the brightness value change pattern 1210 may be output to the smart watch 120-$n$, and the output brightness value change pattern 1210 may be read by the smart phone 110. In this case, pairing between the smart phone 110 and the smart watch 120-$n$ is also executed.

In the present invention, since a brightness value change pattern to which a different color change pattern has been added is output, the present invention may be implemented in various manners. Further, a plurality of terminals may be paired with each other without a user's additional input. Besides, unlike in the conventional art, a user needs not know a unique identifier in advance.

This may enhance user's convenience.

Various embodiments may be implemented using a machine-readable medium having instructions stored thereon for execution by a processor to perform various methods presented herein. Examples of possible machine-readable mediums include ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet).

This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

INDUSTRIAL APPLICABILITY

The present invention may be variously applied to industry fields related to the system for pairing a plurality of terminals with each other according to the present invention.

The invention claimed is:

1. A device pairing system, comprising:
a device having a display;
n terminals; and a server configured to connect the device having a display with the n terminals, wherein the server provides an ID to the device having a display according to an access request from the device, wherein the device having a display calculates a brightness value change pattern corresponding to the ID, and outputs the pattern to the display, wherein each of the n terminals detects the pattern output to the display using a proximity sensor and a light sensor, then recognizes the ID, transmits the ID to the server, and requests for access, wherein the device having a display outputs the brightness value change pattern indicating an image by adding a color in order to represent a shape or a text, wherein a detailed content related to the image is output to each of the device and an nth terminal according to the device and the nth terminal pairing with each other, wherein the device having a display converts the ID into a binary code, and then calculates the brightness value change pattern in a preset color space according to a preset regulation, wherein a color value (H) is changed in a fixed state of a chroma value (S) and a brightness value (L) in the color space, wherein the brightness value change pattern is calculated with a principle to divide the brightness value (L) into preset sections and to change the color value (H), and wherein when a first terminal and a second terminal simultaneously approach the brightness value change pattern, the server simultaneously pairs the device, the first terminal and the second terminal with one another.

2. The device pairing system of claim 1, wherein if at least one of the n terminals moves in a proximity state to the display by a preset degree, the device having a display outputs the brightness value change pattern on a region of the display corresponding to a position where the at least one terminal has moved.

3. The device pairing system of claim 1, wherein if at least one of the n terminals approaches the display by a preset degree, the device having a display outputs the brightness value change pattern on a region of the display corresponding to a position where the at least one terminal has approached.

4. A device pairing method, comprising:
(a) requesting to a server for access, by a device having a display;
(b) assigning an ID to the device according to the access request, and transmitting the ID to the device by the server;
(c) calculating a brightness value change pattern corresponding to the received ID, and outputting the pattern to the display by the device;
(d) detecting the pattern output to the display using a proximity sensor and a light sensor, then recognizing the ID, and transmitting the recognized ID to the server to request for access by each of n terminals; and
(e) connecting the device having a display to the n terminals by the server, wherein the step of (c) includes outputting the brightness value change pattern indicating an image by adding a color in order to represent a shape or a text by the device, wherein the step of (e) includes outputting a detailed content related to the image to each of the device and an nth terminal according to the device and the nth terminal pairing with each other, wherein the step of (c) includes converting the ID into a binary code and then calculating the brightness value change pattern in a preset color space, according to a preset regulation, by the device having a display, wherein a color value (H) is changed in a fixed state of a chroma value (S) and a brightness value (L) in the color space, wherein the brightness value change pattern is calculated with a principle to divide the brightness value (L) into preset sections and to change the color value (H), and wherein when a first terminal and a second terminal simultaneously approach the brightness value change pattern, the server simultaneously pairs the device, the first terminal and the second terminal with one another.

5. The method of claim 4, wherein the step of (c) includes outputting the brightness value change pattern on a region of the display corresponding to a position where at least one of the n terminals has moved, by the device having a display, if the at least one terminal moves in a proximity state to the display by a preset degree.

6. The method of claim 4, wherein the step of (c) includes outputting the brightness value change pattern on a region of the display corresponding to a position where at least one of the n terminals has approached, if the at least one terminal has approached the display by a preset degree.

7. A mobile terminal, comprising:
a proximity sensor configured to sense a proximity degree with a device having a display;
a light sensor configured to sense a brightness value change pattern output to the display; and
a controller configured to recognize an ID corresponding to the sensed brightness value change pattern, to transmit the recognized ID to a server, and to request for access, wherein the device having a display requests to the server for access to thus be provided with the ID, calculates a brightness value change pattern corresponding to the ID, and outputs the pattern to the display, wherein the server connects the device having a display with the mobile terminal according to the access request from the controller, wherein the device having a display outputs the brightness value change pattern indicating an image by adding a color in order to represent a shape or a text, wherein a detailed content related to the image is output to each of the device and the mobile terminal according to the device and the mobile terminal pairing with each other, wherein the device having a display converts the ID into a binary code, and then calculates the brightness value change pattern in a preset color space according to a preset regulation, wherein a color value (H) is changed in a fixed state of a chroma value (S) and a brightness value (L) in the color space, wherein the brightness value change pattern is calculated with a principle to divide the brightness value (L) into preset sections and to change the color value (H), and wherein when a first terminal and a second terminal simultaneously approach the brightness value change pattern, the server simultaneously pairs the device, the first terminal and the second terminal with one another.

* * * * *